Aug. 1, 1939. F. M. WILLIAMSON 2,167,702
VANITY CASE
Filed July 11, 1938 2 Sheets-Sheet 2

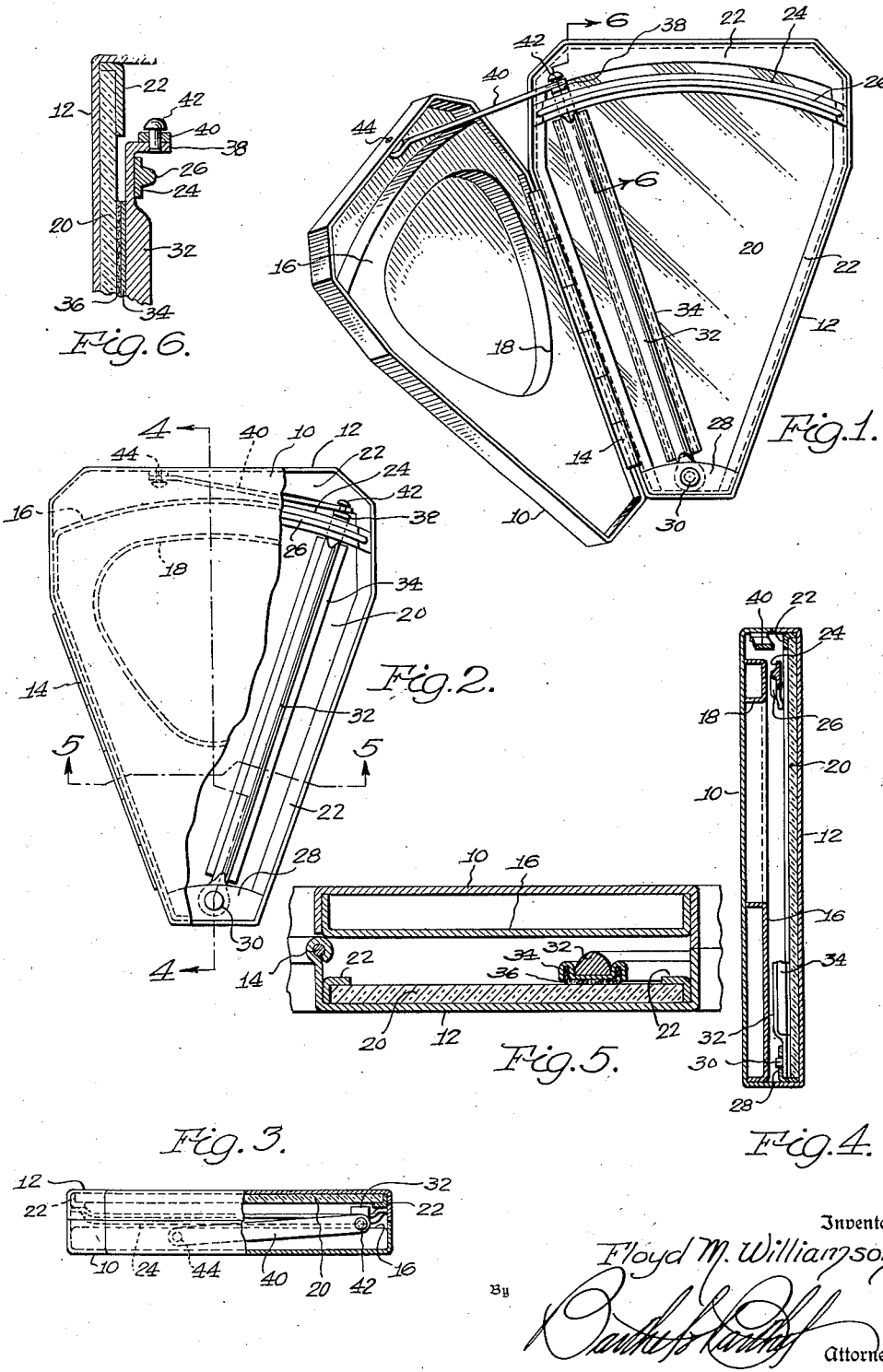

Inventor
Floyd M. Williamson,
By
Attorneys

Patented Aug. 1, 1939

2,167,702

UNITED STATES PATENT OFFICE 2,167,702

VANITY CASE

Floyd M. Williamson, Detroit, Mich.

Application July 11, 1938, Serial No. 218,511

11 Claims. (Cl. 132—83)

The present invention relates, in general, to vanity cases and, in particular, to vanity cases of the self-cleaning type.

One of the main objects of the invention is to adapt a vanity case having a mirror with a pivoted mirror wiper which, when the case is opened, will clean a substantial mirror surface uniformly thereover.

Another object of the invention is to provide a vanity case having a mirror container and a cosmetic container with a mirror wiping member, the latter being pivoted to the mirror container and guided in its travel by a guide member on said mirror container, and said mirror wiping member at its free end being pivotally actuated over said mirror by said cosmetic container upon the opening and closing of the latter.

Another object is to provide a vanity case with a pivoted automatic mirror cleaning device which, at its free end, is guided across the face of the vanity case mirror by a single guide member of arcuate form, said guide member being substantially rigid for holding the mirror cleaner with uniform pressure along its length against the mirror and which, because of its singularity, enhances the economy in production of such device and simplicity in operation.

Another object of the invention is to provide a vanity case having the usual mirror container, mirror and cosmetic container with a mirror wiper which is pivoted to the mirror container for operative wiping engagement with the mirror and which is actuated by the swinging of one container toward or from the other, said wiper being guided in its travel and controlled in its pressure application at only one end, thereby minimizing the cost and time of production and assembly, making possible the installation of a wiper in an ordinary vanity case already in use, and insuring long and continued use without inconvenient repair.

Still other objects and advantages will become readily apparent from a reference to the following specification taken in conjunction with the accompanying drawings of which there are two (2) sheets and wherein:

Figure 1 is a front elevation of a vanity case in open position and showing the invention incorporated therein;

Fig. 2 is a front elevation of the vanity case of Fig. 1 in closed position, same being partly broken away to show more clearly the arrangement of parts while the case is closed;

Fig. 3 is a top edge elevation of the closed vanity case of Fig. 2 and showing parts in section;

Figure 7:
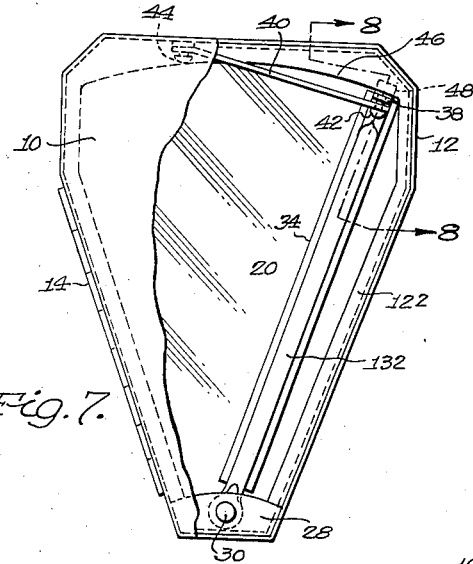
Figure 8:
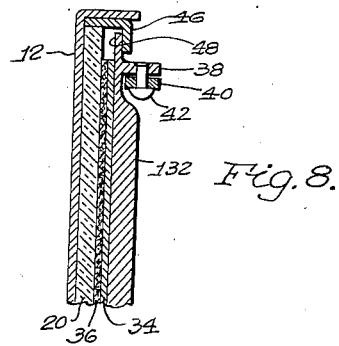
Figure 9:
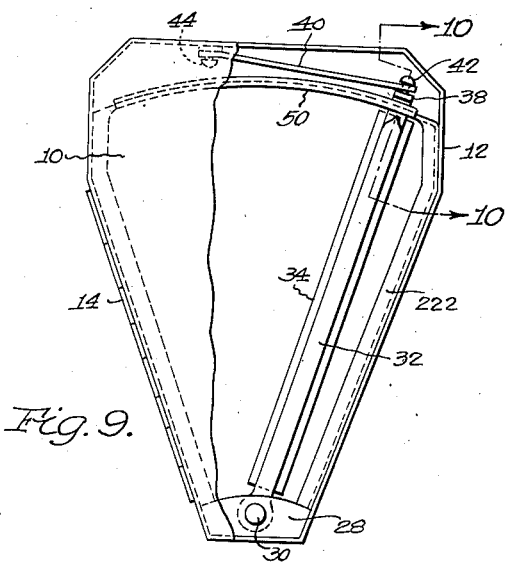
Figure 11:
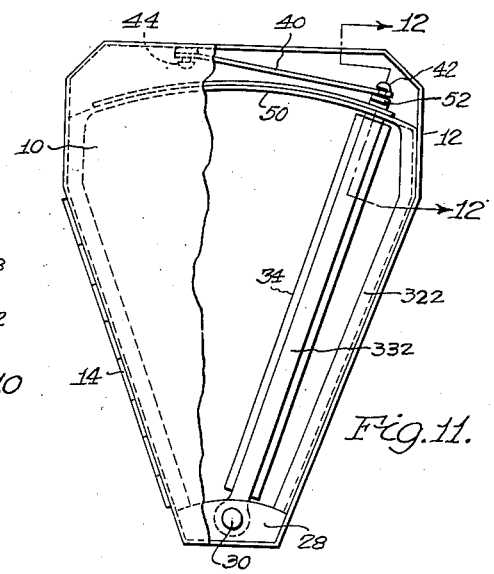
Figure 10:
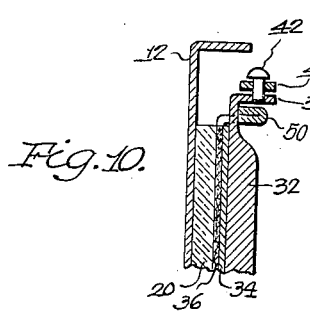
Figure 12:
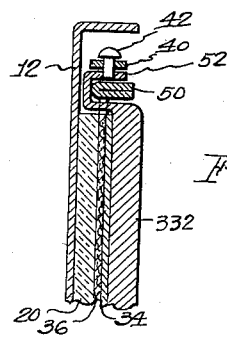

Figs. 4 and 5 are sectional views taken along the lines 4—4 and 5—5, respectively, in Fig. 2;

Fig. 6 is a sectional view taken along the lines 6—6 in Fig. 1;

Figs. 7, 9 and 11 are views similar to Fig. 2 but show modifications thereof; and Figs. 8, 10 and 12 are sectional views taken along the lines 8—8, 10—10 and 12—12, respectively, in Figs. 7, 9 and 11, respectively.

The vanity case shown in Figs. 1 through 6 comprises a pair of complementary box-like containers 10 and 12, hinged as at 14 for swinging movement toward and from each other, container 10 serving as a cosmetic container and also as the cover for the vanity case, and container 12 serving as a mirror container. In closed position containers 10 and 12 are adapted for abutting relation along their flanged edges which form the box-like structures, and a clasp arrangement (not shown) may be provided for holding said containers in closed position, or, if preferred, the hinging means 14 may be resilient and adapted for restraining the opening of the containers.

Container 10 may be provided with means for holding cosmetics, such as powder and rouge, in place therein, and the means shown, solely for the purpose of illustration, comprises an inverted box-like member 16 fitting and secured in any suitable manner into the container 10 and including a depression 18 in which is usually received a powder puff. Member 16 is confined behind the plane containing the surface of container 16 which abuts container 12 when the two latter containers are closed, and member 16 is spaced from the top of container 10, for reasons which will appear later.

Container 12 has disposed therein a mirror 20 which preferably has a configuration similar to the plan configuration of container 12 and which is adapted for fitting up against the flat surface thereof. A pad (not shown) may or may not be provided between the container 12 and mirror 20. For holding mirror 20 in place container 12 is provided with an internal marginal flange 22 which engagingly encircles mirror 20 at its periphery and serves to retain said mirror tightly in position in container 12. Mirror 20 and flange 22 are confined behind the plane containing the surface of container 12 which abuts container 10 when the two containers are in closed position.

Extending between opposite sides of container 12, and secured to the exposed surface of flange 22 thereat, is an arcuately shaped bar or guide member 24 which, because of it being secured to the exposed surface of flange 22, is spaced from mirror 20 a distance equal to the height that flange 22 extends above the surface of mirror 20. Member 24 is secured in any appropriate manner to the flange 22, such as by welding, sweating, or otherwise, and is provided, preferably, with a strengthening rib 26. Container 12, opposite the guide 24, is also provided with a cross plate 28 which extends between opposite sides of container 12 and is secured, by welding, sweating, or otherwise, onto the exposed surface of flange 22 so that the under surfaces of plate 28 and guide 24 are substantially equally spaced from mirror 20.

To the under surface of plate 28 is pivoted, such as at 30, a wiper bar 32 which extends from pivot 30 longitudinally across the face of mirror 20 to a position below and beyond the guide bar 24, the latter constraining wiper bar 32 to move in a plane adjacent to and parallel with the face of mirror 20 as said wiper bar is pivoted about 30. An inverted double U-shaped member 34 is secured to the underside of wiper bar 32, and same extends between the opposing edges of guide bar 24 and cross plate 28. To member 34 along its length is secured by means of said U-shaped portions a cleaning element 36, such as chamois, which is held against the mirror 20 uniformly along its length by the pressure exerted on bar 32 at its ends by guide 24 and plate 28. The portion of wiper bar 32 which extends between the guide bar 24 and the portion of flange 22 adjacent thereto provides a head 38 to which one end of an arm 40 is pivoted, such as at 42. The other end of arm 40 is pivoted, such as at 44, to the wall of container 10 which is spaced from the box-like member 16, the length of arm 40 equalling substantially the distance between pivot 44 and the side of container 10 which is opposite its hinged side so that, when containers 10 and 12 are closed, arm 40 will be confined within the space provided therefor above the member 16. Arm 40 is also of such length as to carry wiper bar 32 from one side of the mirror 20 to the other when the containers are opened, and to cause the bar 32 to reverse its travel when the containers are closed.

The arrangement above described provides for compactness and simplicity, there being a minimum number of parts which are liable to get out of order when the vanity case is used by a careless user. Opening of the case exerts a pull at a minimum number of places, and to insure against breakage or inoperation stress need practically be laid only on the rigidity of the guide member 24, since this member is the member upon which the greatest pull is exerted. When the vanity case is opened, a pull through arm 40 is exerted on guide member 24 and at the same time a push is exerted at pivot 30 so that cross plate 28 need not be very strong. Guide 24, being rigid partly because of its short length as compared to the longitudinal length of the vanity case itself, is suitably adapted for counteracting this pull, and wiper 32—34—36 is thereby kept in a plane adjacent to and parallel with the face of the mirror 20 during its arcuate movement. It follows also that wiper bar 32 may be made comparatively light and that the wiping structure, being supported by means at the plane of the exposed surface of flange 22 of container 12, is adapted for installation in a presently used vanity case not already equipped therewith.

The device shown in Figs. 7 and 8 is similar to the device shown in Figs. 1 through 6, with slight differences. The marginal flange 122 of container 12 differs from the marginal flange 22 in that the exposed surface thereof at the top end of the container 12 is up raised, such as at 46, to accommodate an extension 48 of wiper bar 132, bar 132 being similar to bar 32 in all other respects. This arrangement eliminates the necessity for the guide bar 24 disclosed in Figs. 1 through 6 and calls upon the portion 46 of the marginal flange 132 which retains the mirror 20 in place to serve as the guide for the wiping structure 132—34—36. In this arrangement the bar 40 is pivoted to the underside of head 38 of bar 132, rather than as shown in Figs. 1 through 6, such difference being, naturally, a necessary difference.

Figs. 9 and 10 show a modification wherein bar 24 is still eliminated. The marginal flange 222 which retains mirror 20 in place is cut short of the top end of container 12 and is provided thereat with an upwardly extending double thickness edge flange 50, flange 50 extending arcuately across the container 12 and providing at its under surface the guiding means for the head 38 of wiper bar 32. The mirror 20 is also shown as being cut short of the top and of container 12, but it can just as well extend therebeyond. Flange 50 with its double thickness is thereby made more rigid.

Figs. 11 and 12 show a structure similar to that shown in Figs. 9 and 10, except that the flange 50 extends downwardly toward the back of container 12, rather than upwardly away therefrom as in Figs. 9 and 10, this necessitating wiper bar 232 to be provided with a channel-shaped head 52 for being received and guided by the under surface of the flange 50. The rigidity and guiding feature of flange 50 is still preserved.

Although the invention has been described with some detail, the description is not intended to limit the scope of the inventive idea. The right is reserved to make such changes in the specification and drawings as will come within the purview of the attached claims.

What I claim is:

1. In a vanity case having a pair of hinged casings, a mirror secured in and against displacement from one of said casings, a wiper element engaging the face of said mirror and being pivoted at one end to said casing, and means connected to the other end of said element and actuated by the relative movement of said casings for moving said element in an arcuate path over the face of said mirror.

2. In a vanity case having a pair of hinged casings, a mirror secured in and against displacement from one of said casings, a wiper element pivoted at one end to said casing, means in said casing for constraining said element into engagement with said mirror, and means connected to the other end of said element and actuated by the relative movement of said casings for moving said element in an arcuate path over the face of said mirror.

3. In a vanity case having a pair of hinged casings, a mirror secured in and against displacement from one of said casings, a wiper element pivoted at one end to said casing, means in said casing for constraining said element into engagement with said mirror and for constantly maintaining said engagement, and means connected to the other end of said element and actuated by the relative movement of said casings for moving said element in an arcuate path over the face of said mirror.

4. In a vanity case having a pair of hinged casings, a mirror secured in and against displacement from one of said casings, a wiper element pivoted at one end to said casing, means in said casing for constraining said element into engagement with said mirror, and means connected to the other end of said element and actuated by the relative movement of said casings for moving said element in an arcuate path over the face of said mirror, said first means comprising a guide for the end of said element to which said second means is connected.

5. In a vanity case having a pair of hinged casings, a mirror secured in and against displacement from one of said casings, a wiper element pivoted at one end to said casing, means in said casing for constraining said element into engagement with said mirror, and means connected to the other end of said element and actuated by the relative movement of said casings for moving said element in an arcuate path over the face of said mirror, said first means comprising an arcuate guide for the end of said element to which said second means is connected.

6. In a vanity case having a pair of hinged casings, a mirror secured in and against displacement from one of said casings, a wiper element pivoted at one end to said casing, means in said casing extending between the sides thereof and above said mirror for constraining said element into engagement with said mirror, and means connected to the other end of said element and actuated by the relative movement of said casings for moving said element in an arcuate path over the face of said mirror.

7. In a vanity case having a pair of casing members hingedly secured to each other at an edge thereof, a mirror in one of said casing members, said member being provided with means for holding said mirror in place therein, a wiper element pivoted at one end to said member, a guide member for said element extending between the sides of said casing member above said mirror and formed on said first means, and means connected to the opposite end of said element and to said other casing member for moving said element on and across the face of said mirror about said pivot through an arcuate path during relative movement of said casing members.

8. In a vanity case having a pair of hinged casings, a mirror in one of said casings, said casing having a marginal flange over-lappingly engaging the edges of the face of said mirror, a guide member spaced above said mirror and secured to opposite portions of said flange, a wiper element in engagement with the face of said mirror and having one end constrained beneath said guide member for sliding movement relative thereto and having the other end pivoted to said casing, and actuating means for said wiper element interconnecting the free end thereof with said other casing and actuated by the relative movement of said casings for moving said wiper element through an arcuate path on and over the face of said mirror.

9. In a vanity case having a pair of hinged casings, a mirror in one of said casings, said casing having a marginal flange overlappingly engaging the edges of the face of said mirror, an arcuate guide member spaced above said mirror and from an edge of said flange and secured to opposite portions of said flange, a wiper element in engagement with the face of said mirror and having one end constrained beneath said guide member for sliding movement relative thereto and having the other end pivoted to said casing, said sliding end of said wiper element extending to a position between said flange and said guide member, and actuating means for said wiper element interconnecting the sliding end thereof with said other casing and actuated by the relative movement of said casings for moving said wiper element through an arcuate path on and over the face of said mirror.

10. In a vanity case having a pair of hinged casings, a mirror in one of said casings, said casing having a flange overlappingly engaging a marginal portion of said mirror and including an interrupted length spaced above said mirror, a pivoted wiper element engaging the face of said mirror and having its free end extending underneath the interrupted length of said flange for being constrained against the mirror thereby, and means interconnecting said free end of said element and said other casing for actuating said element about its pivoted end and relative to said interrupted portion during the opening and closing of said casings.

11. In a vanity case having a pair of hinged casings, a mirror in one of said casings, said casing being formed with a flange overlappingly engaging a portion of the marginal border of said mirror, said flange above the exposed portion of said mirror border being formed substantially normal to a plane parallel with the face of said mirror, a wiper element engaging said face of said mirror and pivoted to said casing, said element at its free end extending beyond and in sliding engagement with the under surface of said portion of said flange normal to said plane, and means between said free end of said element and said other casing for actuating said element through an arcuate path on and over the face of said mirror as said casings are moved toward and away from each other.

FLOYD M. WILLIAMSON.